United States Patent
Blinov et al.

(10) Patent No.: US 11,978,032 B2
(45) Date of Patent: May 7, 2024

(54) SYSTEM AND METHOD FOR PERFORMING PEER TO PEER TRANSFERS

(71) Applicant: MASTERCARD INTERNATIONAL INCORPORATED, Purchase, NY (US)

(72) Inventors: Mikhail Blinov, Dublin (IE); Dawid Nowak, Dublin (IE); Vladut Druta, Dublin (IE); Cian Burns, Dublin (IE); Aidan Cunnion, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 885 days.

(21) Appl. No.: 16/154,847

(22) Filed: Oct. 9, 2018

(65) Prior Publication Data

US 2019/0108504 A1 Apr. 11, 2019

(30) Foreign Application Priority Data

Oct. 9, 2017 (EP) .................................... 17195532

(51) Int. Cl.
*G06Q 20/22* (2012.01)
*G06Q 20/20* (2012.01)
(Continued)

(52) U.S. Cl.
CPC ......... *G06Q 20/223* (2013.01); *G06Q 20/208* (2013.01); *G06Q 20/3674* (2013.01); *G06Q 20/4014* (2013.01); *G06Q 20/405* (2013.01)

(58) Field of Classification Search
CPC .................................................. G06Q 20/223
See application file for complete search history.

(56) References Cited

U.S. PATENT DOCUMENTS 9,866,989 B2 * 1/2018 Beenau ............... G06Q 20/3552
10,057,225 B1 * 8/2018 Hayes ................. H04W 12/069
(Continued)

FOREIGN PATENT DOCUMENTS

JP 2014-523591 A 9/2014
JP 2016-181192 A 10/2016
(Continued)

OTHER PUBLICATIONS

"International Search Report and Written Opinion Issued in PCT Application No. PCT/US2018/053293", dated Nov. 21, 2018, 13 Pages.
(Continued)

*Primary Examiner* — Jay Huang
(74) *Attorney, Agent, or Firm* — Talem IP Law, LLP

(57) ABSTRACT

In a first party mode, a peer-to-peer transfer application: authenticates the party to an identity server; obtains an amount of funds to be transferred; causes the identity server to establish a session for storing information relating to the transaction; provides the amount to the identity server; provides account information for the party to the identity server; obtains a token unique to the transaction; obtains contact information for the counterparty; and provides a message including the token to the counterparty to indicate the transaction has been initiated. In a second counterparty mode, the application: receives a message including a token for a transaction from a first party; authenticates the counterparty; determines the counterparty wishes to complete the transaction; and uses the token to provide account information for the counterparty to the identity server for storing in association with an established session and to enable the identity server to complete the transaction.

12 Claims, 4 Drawing Sheets

(51) Int. Cl.
*G06Q 20/36* (2012.01)
*G06Q 20/40* (2012.01)

(56) References Cited

U.S. PATENT DOCUMENTS

| | | | | |
|---|---|---|---|---|
| 10,395,253 | B2* | 8/2019 | Hessler | G06F 21/105 |
| 10,575,348 | B2* | 2/2020 | Meads | H04L 67/06 |
| 2007/0022058 | A1* | 1/2007 | Labrou | G06Q 20/322 |
| | | | | 705/67 |
| 2012/0284175 | A1* | 11/2012 | Wilson | G06Q 20/10 |
| | | | | 705/39 |
| 2012/0290376 | A1 | 11/2012 | Dryer et al. | |
| 2013/0024360 | A1 | 1/2013 | Ballout | |
| 2013/0238492 | A1 | 9/2013 | Muthu et al. | |
| 2014/0149293 | A1 | 5/2014 | Laracey | |
| 2014/0172716 | A1 | 6/2014 | Viidu et al. | |
| 2014/0297892 | A1* | 10/2014 | Kaigawa | G06F 3/1292 |
| | | | | 710/5 |
| 2015/0100637 | A1* | 4/2015 | Lakshmegowda | G06Q 20/027 |
| | | | | 709/204 |
| 2015/0278816 | A1 | 10/2015 | Fleishman et al. | |
| 2016/0019536 | A1* | 1/2016 | Ortiz | G06Q 20/36 |
| | | | | 705/67 |
| 2016/0104132 | A1 | 4/2016 | Abbatiello et al. | |
| 2016/0219111 | A1* | 7/2016 | Qi | H04W 84/18 |
| 2016/0328700 | A1 | 11/2016 | Bortolotto et al. | |
| 2017/0063982 | A1* | 3/2017 | Doherty | H04L 67/1078 |
| 2017/0364898 | A1* | 12/2017 | Ach, II | G06Q 50/01 |
| 2018/0035281 | A1* | 2/2018 | Erginler | H04W 8/183 |

FOREIGN PATENT DOCUMENTS

| | | |
|---|---|---|
| WO | 2016/057035 A1 | 4/2016 |
| WO | 2017/072589 A2 | 5/2017 |

OTHER PUBLICATIONS

"Search Report Issued in European Application No. EP 17 19 5532", dated Dec. 20, 2017, 10 Pages.
FIDO Alliance, "FIDO UAF Architectural Overview", https://fidoalliance.org/specs/fido-uaf-v1.1-id-20170202/fido-uaf-overview-v1.1-id-20170202.html, Feb. 2, 2017, 9 pages.
Summons to Attend Oral Proceedings Issued in Application No. 17195532.1, Mail Date: May 15, 2020, pp. 9.
Office Action issued in Japanese Application No. 2020-520157, dated Apr. 20, 2021, 3 pages.
1 Office Action issued in Japanese Application No. 2020-520157, dated Aug. 24, 2021, 2 pages.

* cited by examiner

SYSTEM AND METHOD FOR PERFORMING PEER TO PEER TRANSFERS

FIELD

The present invention relates to a system and method for performing peer to peer transfers.

BACKGROUND

Payment applications which can be installed on end user devices such as smartphones, tablets or even general purpose computers to enable peer-to-peer payments between a payer and payee, generally require that the details of the payee are provided when payment is initiated by a payer. This implies that every payer either needs to obtain, input and store the bank account details for any payee to which they wish to make a payment; or rely on a common system to provide those.

For the former in particular, the burden of having a payer receive account details, which can involve relatively long numbers, potentially from many different payees, has acted as one barrier to adoption of such payment applications. Thus, unsurprisingly the market for peer-to-peer payments has not taken off yet and there are many applications such as from Skype or Paypal with relatively low market penetration or usage.

BRIEF SUMMARY

According to embodiments the present invention, there is provided a method for performing a peer to peer transfer. The method can include, in a first party mode: authenticating the party to an identity server; obtaining from the party an amount of funds to be transferred between the party and a counterparty; causing the identity server to establish a session for storing information relating to the transaction; providing the amount to the identity server for storing in association with the session; providing account information for the party to the identity server for storing in association with the session; obtaining a token unique to the transaction from the identity server; obtaining contact information for the counterparty; and providing a message including the token to the counterparty using the contact information to indicate to the counterparty that the transaction has been initiated; and in a second counterparty mode: receiving a message from a first party to a transaction, the message including a token for a transaction; authenticating the counterparty to the identity server; determining that the counterparty wishes to complete the transaction; and responsive to the determining, using the token to provide account information for the counterparty to the identity server for storing in association with an established session for the transaction and to enable the identity server to complete the transaction; and receiving results for any completed transaction from the identity server.

In a second aspect there is provided a computer program product comprising a computer readable medium on which instructions are stored which, when executed on a computer system, is configured for performing the above described method for performing a peer to peer transfer.

In a third aspect there is provided a device for performing the above described method for performing a peer-to-peer transfer.

Certain embodiments of the invention combine ease of use and adoption with a high degree of trust and security for users.

Certain embodiments allow for the transfer of funds between peers without necessarily having to create an account or log into an account. Participating parties (sender and receiver) can be correlated through an ephemeral session key which changes from transaction to transaction.

Certain embodiments can be based on biometric authentication so avoiding the need for a user to generate or remember new usernames or passwords.

Certain embodiments are based on a two phase payment strategy. This means that a one party's payment credentials don't need to be known or disclosed to the counter-party when a payment is initiated. An additional benefit of such a system is that payment details do not have to be stored centrally.

The end user application can either be implemented as a stand-alone funds transfer application or the functionality can be embedded within other applications such as e-commerce or M-commerce applications, for example, to facilitate electronic payments not alone from customer to customer, but also from customer to merchant or merchant to merchant, thus payments can be facilitated between many different operators.

BRIEF DESCRIPTION OF THE DRAWINGS

Embodiments of the invention will now be described, by way of example, with reference to the accompanying drawings, in which.

DETAILED DESCRIPTION

Figure 1:
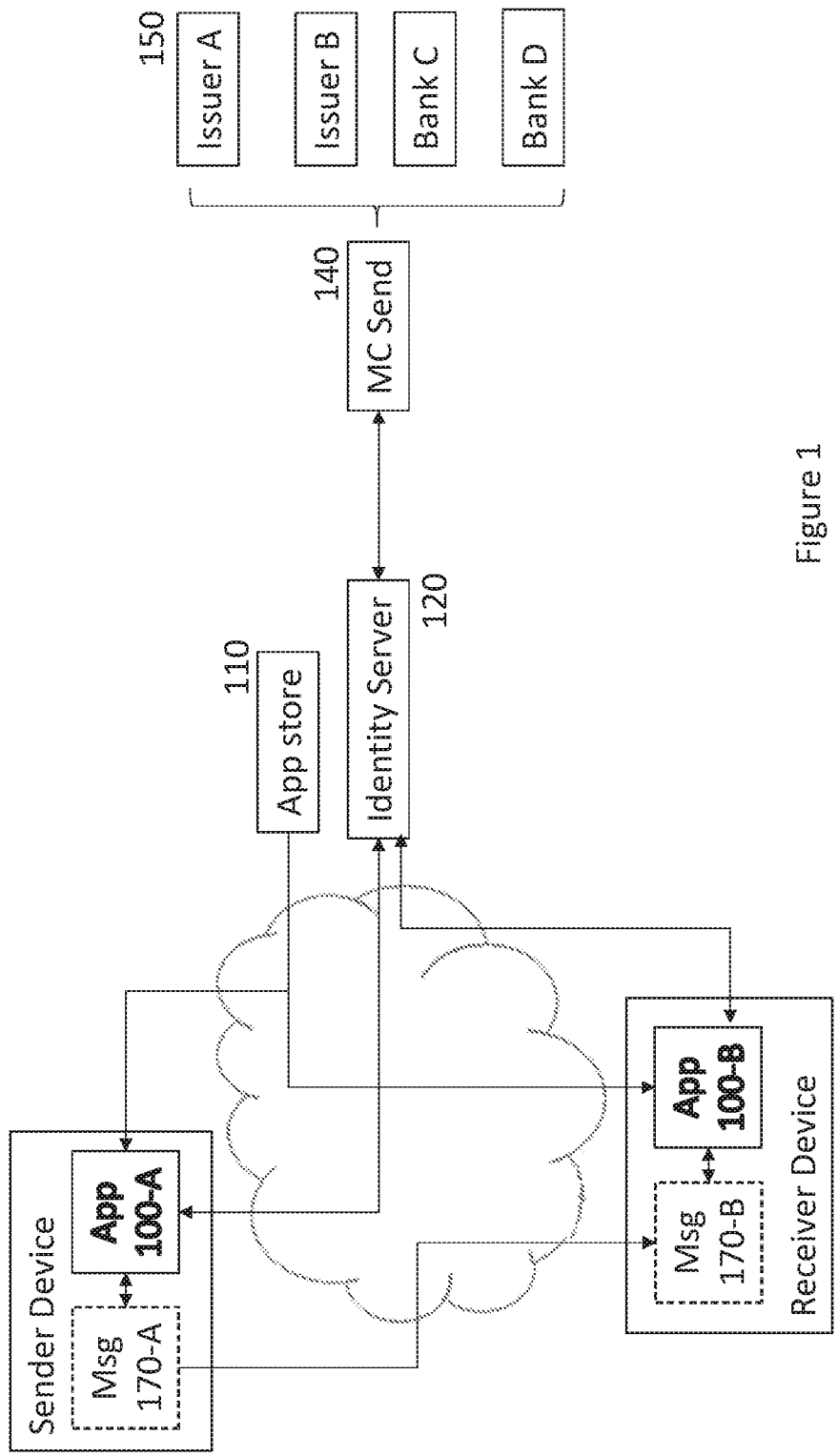
FIG. 1 is a diagram illustrating the interoperating components of a payment system according to an embodiment of the present invention.

Referring now to FIG. 1, in a payment system according to an embodiment of the present invention, a user of a device through which they wish to initiate a payment first installs a payment application on their device.

As will be appreciated, where the device is a typical smartphone or tablet based on the Android or iOS operating systems, the user can download such an application from an app store 110. Alternatively, especially where the device is a Windows based desktop or laptop device, but this can also be the case for a smartphone, the user can download the application from an application provider website. In a still further variation, rather than a stand-alone client application, the application can be implemented as a browser based application.

In any case, the initiating user can either be a payer (sender) or a payee (receiver) and the example below will be described with reference to a payment being initiated by a sender.

Figure 2:
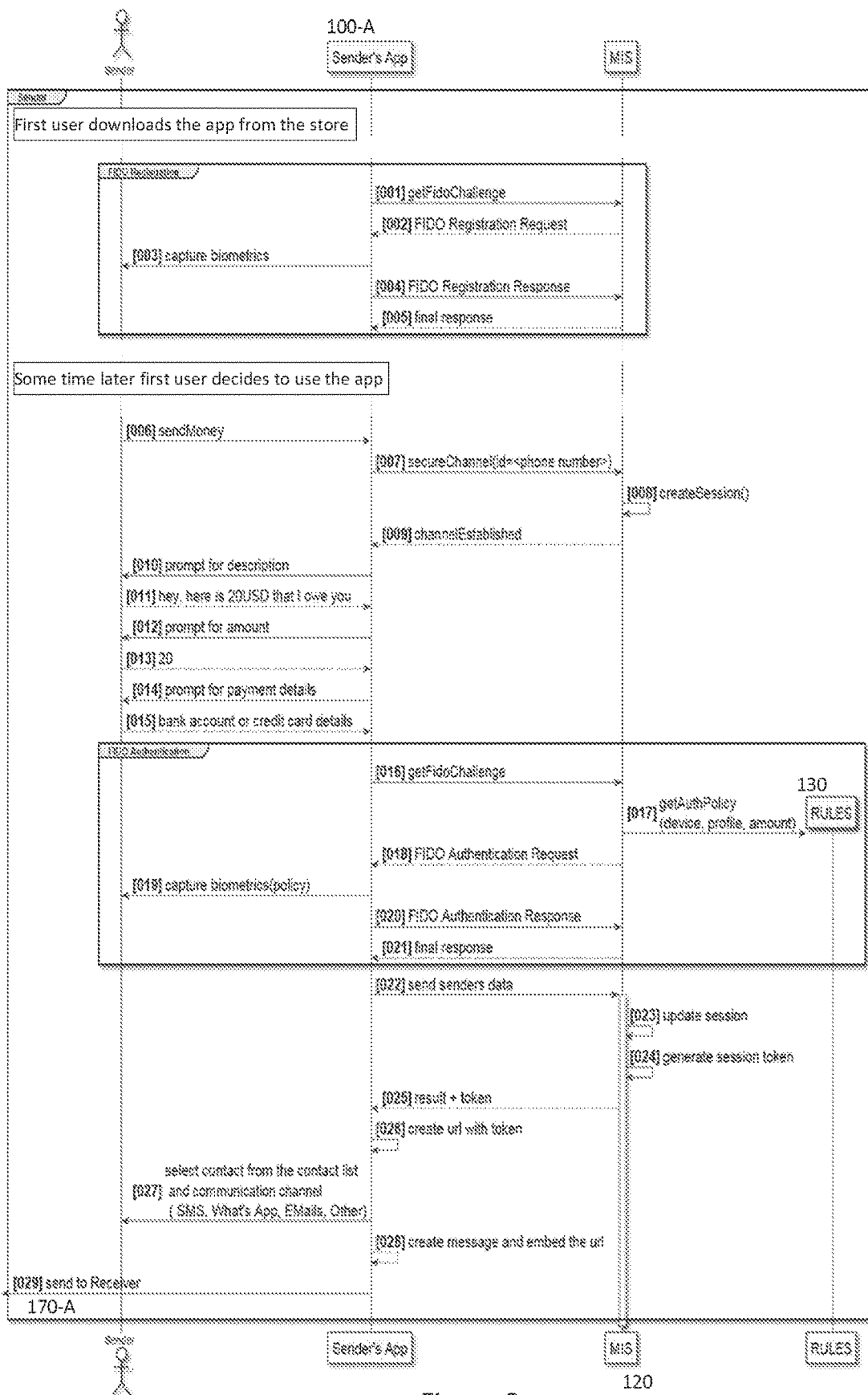
FIG. 2 illustrates the steps performed by an application operated by a payer (sender) in communication with an identity server from FIG. 1.

Referring now to FIG. 2, when the sender first executes their application 100-A, on their device, they register their identity with an identity server 120. In one implementation, they do so based on FIDO ("Fast IDentity Online") protocols defined by the FIDO Alliance. FIDO protocols use standard public key cryptography techniques to provide authentication. During registration with the identity server 120, the user's application 100-A creates a new key pair. The application 100-A retains the private key and registers the public key with the online server 120. Subsequent authentication is done by the user through the application 100-A proving possession of the private key to the server by signing a challenge. The client's private keys can be used only after they are unlocked locally on the device by the user. The local unlock is accomplished by a user-friendly and secure action such as swiping a finger, entering a PIN, speaking into a microphone, inserting a second-factor device or pressing a button or indeed using any form or combination of biometric information.

The FIDO protocols are designed to protect user privacy as they do not provide information that can be used by different online services to collaborate and track a user across the services. Biometric information, if used, never leaves the user's device.

Accordingly, at step (001), the sender's application 100-A connects with the identity server 120 and requests a challenge by way of registration request which is provided by the identity server at step (002). On receipt of the challenge, from the identity server 120, the sender's application 100-A captures the required user's biometrics, step (003). As indicated, this can comprise any combination of swiping a finger, entering a PIN, speaking into a microphone, inserting a second-factor device or pressing a button etc. A response including a public key for the sender based on the user's biometrics is provided back to the identity server 120 at step (004) and once the public key is registered, this is confirmed by the identity server 120 to the sender application 100-A at step (005).

The sender can now decide to send money using their instance of the application 100-A at any subsequent time. (Indeed as will be explained later, once they have installed their instance of the application 100-A and registered with the identity server 120, they are also in a position to receive requests from potential payees.)

In the example, of FIG. 2, the sender application 100-A is installed on a mobile (cellular) device with a phone number as an identifier and so a secure channel based on the phone number can be established between the sender application 100-A and the identity server 120 based on that identifier, step (007). It will be appreciated that in other embodiments where the sender application 100-A is installed on a non-mobile device, an equivalent secure channel can be established using other mechanisms or based on other identifiers for example a MAC identifier. In any case, in response to establishing the channel, a session can be established, step (008) and acknowledged by the identity server 120 to the sender application 100-A, step (009). As will be seen, the session established within the identity server 120 acts as a placeholder for the information required for any given transaction.

In the embodiment, once the sender application 100-A receives notification of establishment of the session, the application 100-A can prompt the sender for a message associated with the payment, step (010). In the example, at step (011), the user enters the free form message "hey, here is the 20USD that I owe you". At steps (012) and (013), the user actually enters a monetary amount to be transferred. It will of course be appreciated that any suitable mechanism can be employed to enable the user to determine the amount of the payment to be made and any message to accompany the payment.

At steps (014) and (015), the identity server 120 requests and the sender application 100-A provides the sender's bank account details from which the funds will be transferred.

Thus, if the user has not already stored bank account details in the application, they will be prompted to do so, and if they have provided details of more than one account to the application 100-A, they will be prompted to select an account before these details are returned to the identity server 120.

The user can now authenticate themselves to the identity server 120, through steps (016) to (021). As will be seen, the information required to be provided by the user for authentication can be based on any combination of the device they are employing, the user's profile and the amount of the transfer as determined by an authentication rules engine 130 operating in conjunction with the identity server 120. Such policy based authentication is disclosed, for example, in European Publication No. EP2605567 in the name of Daon Holdings Limited and related applications.

Once the sender is authenticated, the sender application 100-A sends the data gathered at steps (010) to (015) to the identity server 120, step (022). In this regard, it will be seen that any of steps (010) to (015) could also follow authentication steps (016) to (021).

The identity server 120 now updates information for the session created at step (008) with the transaction data received from the sender application 100-A at step (023) and generates a unique token for the transfer at step (024). Thus, the token acts as an ephemeral key to the session for the transaction. The token is provided to the sender application 100-A at step (025) and the sender application 100-A can now use the token to generate a message to be provided to the receiver in order to complete the transaction.

In one embodiment, the application 100-A has access to a contact list installed on the device and which the user normally uses to generate SMS or instant messenger (IM) messages, initiate calls and/or generate e-mails or indeed to facilitate any interaction with their various social networks.

Thus, on receipt of the token from the identity server 120, the application 100-A can request that the sender select a contact from the contact list, step (027) in order to determine the type of message which needs to be generated for the receiver. So where a sender's phone number is selected from a contact list, the application can generate an SMS or IM message including the message and amount entered at steps (011) and (013) as well as a URL generated at step (026) from the token provided by the identity server. The URL enables a receiver of the message to automatically launch an instance of the application on a separate device with the application then displaying the payment message and other details for the transaction identified by the token.

If the sender selects a receiver e-mail address from their contact list, the message generated at step (028) would comprise an e-mail message. This allows fuller information to be included in the message including information relating to the payment application and for example links enabling a user who has not installed the payment application on their device to do so.

In any case, once the message has been generated at step (028), the sender application can send the message using the appropriate application programming interface (API) exposed by the sender device corresponding messaging or e-mail application 170-A, step (029).

Note that in the example of FIG. 2, registration and authentication are performed separately. However, it will be appreciated that when a user first registers with the identity server 120 and then immediately wishes to initiate a payment (either as a payer or payee), steps (016) to (021) may not need to be performed.

Figure 3:
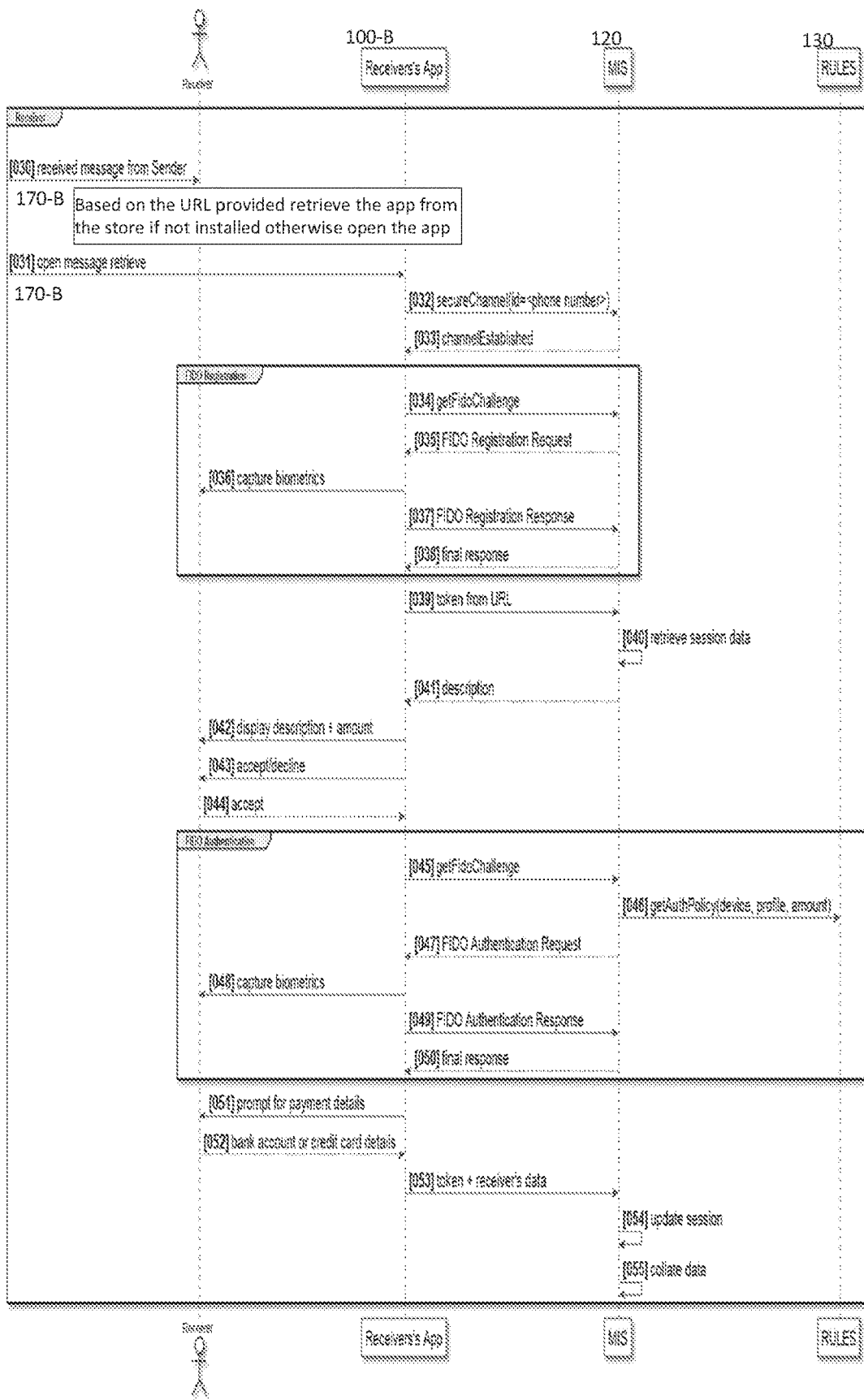
FIG. 3 illustrates the steps performed by the identity server in communication with an application operated by a payee (receiver) from FIG. 1.

Referring now to FIG. 3, which shows the steps performed by a receiver who has not previously installed a payment application on their device.

Step (030) shows the receipt of the message sent by the payer and as will be appreciated, this could appear in any of a messaging application, IM application or e-mail inbox 170-B a receiver has installed on their device.

If the user has not installed the application on their device, the message can enable them to do so by including direct links to the application on the app store 110 or any repository for the application software.

Once the application 100-B is installed, it can be launched from the message at step (031), for example, by clicking on the URL within the message generated at step (026).

If the user has not previously installed and registered themselves with the application 100-B, they do so in steps (034) to (038) as in the case of the sender in steps (001) to (005).

Once again, a secure channel is established between the receiver application 100-B and the identity server, steps (032) and (033) and it will be seen that these steps can be performed either before or after steps (034) to (038), although it is preferred that FIDO registration be performed on a secure channel.

The original token from the message received at step (030) can now be used by the application 100-B to indicate to the identity server 120 the session to which the transaction relates and to retrieve the payment data from the session data stored by the identity server 120, steps (039) to (041).

The application 100-B can now display the sender's detail, description and amount for the payment, step (042), enabling the receiver to accept (or reject) the payment.

If the receiver accepts the payment and they have not authenticated themselves to the receiver application 100-B, they can now do so in steps (045) to (050), again using the authentication rules engine 130 to determine the biometric information to be provided by the receiver.

Again, in the example of FIG. 3, registration and authentication are performed separately. However, it will be appreciated that when a user first registers with the identity server 120 and then immediately wishes to complete a payment (either as a payer or payee), steps (045) to (050) may not need to be performed.

Again, at steps (051) and (052), the identity server 120 requests and the receiver application 100-B provides the receiver's bank account details from which the funds will be transferred.

Thus, if the receiver has not already stored bank account details in the application 100-B, they will be prompted to do so, and if they have provided details of more than one account to the application 100-B, they will be prompted to select an account before these details are returned to the identity server 120, at step (053), along with the token provided in the original message received at step (030).

This enables the identity server 120 to add the receiver details to the session data originally established by the sender, step (054), and to collate this data, step (055).

Figure 4:
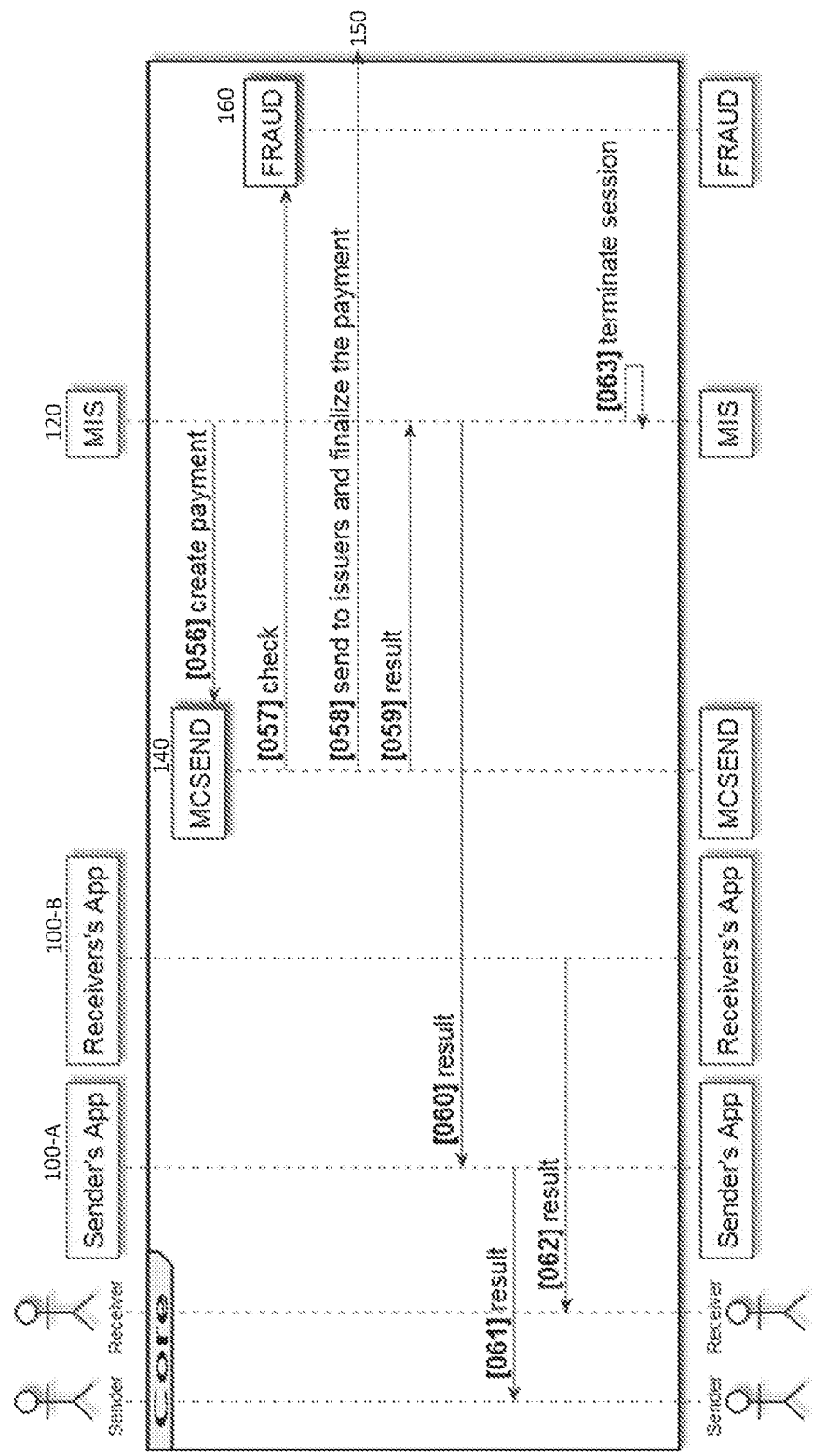
FIG. 4 illustrates the steps performed by the identity server in communication with a payment gateway from FIG. 1.

Turning now to FIG. 4, once the data for a payment is correlated and complete, the identity server 120 can now provide the information to a payment gateway. An exemplary gateway is provided by Mastercard and is referred to as MC Send 140 and this gateway exposes an API enabling a variety of other forms of application to provide transaction details including sender and receiver account details and transaction amount to be executed by the gateway.

Using such a gateway enables a variety of types of transaction to be completed and so for example either of the sender or receiver can specify credit card, debit card or bank account details and a payment gateway such as provided by Mastercard can complete a transfer of the funds accordingly by initiating appropriate messages to the issuers 150 for the credit or debit cards or the banks corresponding to the account information specified by the sender and or receiver.

Before doing so, the payment gateway 140 may check the transaction with a fraud rules engine (gatekeeper) 160 of the type provided by Mastercard or Kount. Gatekeeper servers are typically used to prevent credit card fraud by enabling a merchant to check whether or not a card is valid. They essentially comprise a rules based engine for identifying fraudulent or potentially invalid payment card use and/or databases which can store lists of lost, blocked or stolen payment cards. These rules can include rules for analysing whether a payment card of a particular type, even though valid, can be accepted by a given merchant.

In any case, if the check is in order, the payment gateway 140 can finalise the payment, step (058). Once complete the payment gateway 140 notifies the identity server 120 at step (059) as to whether or not the payment was completed and this information is notified in turn to each of the sender and receiver application, step (060) and these notify the sender and receiver at steps (061) and (062) respectively. The session established at step (008) can now be terminated by the identity server 120, step (063).

As indicated above, it will be appreciated that the implementations of the application 100 can be extended to enable a potential receiver of funds to initiate a transfer. In this case, once authenticated to the identity server 120 at a device the potential receiver can specify a message and an amount (as in steps (010) to (014)) as well as select a potential sender (as in step (027)) so that the application can generate a message to be sent to the potential sender (as in step (029)). In this case, it is the receiver application which establishes a session within the identity server 120 and which initially generates and provides the data for the session with the instance of sender application subsequently providing their data to complete the information required for the session and to enable the transfer to be executed.

It will be appreciated that many variants of the above embodiment are possible. For example, rather than generating a message to be sent to a contact using a messaging service external to the payment application, as in steps (028) and (029), the payment application could instead provide an identifier for the counter-party, i.e. either the sender or receiver, directly to the identity server 120, for example, their phone number, e-mail address or username/nickname or other form of identity, for example, a Google handle.

On receipt of such a message, the identity server 120, could determine if the counterparty is registered i.e. that they had installed the application and registered with the application. In this case, identity server 120 could send a push notification including the token directly to the counter-party device, so enabling the counter-party device to execute steps (032), (033) and (039) to (042) automatically.

In another variation, a sender could provide additional information for or about a potential receiver of funds, so that the identity server 120 might more securely establish the receiver's credentials. Thus, before completing a transaction a sender and receiver might communicate with one another out-of-band in order to establish a private transaction specific codeword sent by the transaction initiator along with the other payment details.

Alternatively, rather than using agreed upon additional information, the initiating party could specify additional authentication information they expect the counterparty to possess.

In other variations, a sender could request a stronger or weaker authentication policy for a receiver. Alternatively or in addition, a sender could request that authentication has to be done on a specific device, for example by providing phone number. In this case, the application would check that the number on which the receiver establishes their secure session matches the specified number before proceeding with the transaction.

In other variations, instances of the application 100 and identity server 120 could operate in conjunction with an online wallet, with the participant providing access details to their online wallet from where identity server 120 could retrieve the payment details of either a sender or receiver account.

It will be appreciated that the application operated by each party to a transaction could be an instance of the same application or the functionality described above for the application could be integrated within a multi-function platform such as an e-commerce or m-commerce application so that in some cases, one party may operate a different application than another to complete a given transaction.

Note that FIDO registration/authentication can also be executed through a browser rather than through a stand-alone application 100 such as described above. As such, it is possible for certain parties, for example, merchants, to operate within the system through a browser based application rather than a dedicated application.

As mentioned above, in some cases, the described method for performing peer to peer transfer can be implemented as a computer program product comprising a computer readable medium on which instructions are stored. In no case does a computer readable medium consist of propagating signals. In some cases, a hardware device is provided for performing the above described method for performing a peer-to-peer transfer. The device can include the instructions stored thereon that when executed by the device perform the method as described herein.

The invention claimed is:

1. A method performed by an application installed on a computing device operated by a first party to a transaction for performing peer-to-peer transfers, the method comprising the application:

in a sender mode:
   authenticating the first party to an identity server;
   obtaining from the first party an amount of funds to be transferred between the first party and a second party;
   causing the identity server to establish a transaction session unique to the transaction, the transaction session providing a placeholder for information relating to the transaction;
   providing account information having the amount of funds to be transferred from the first party and an indication of the amount of funds to be transferred to the identity server for storing in association with the transaction session;
   obtaining a token unique to the transaction from the identity server, the token acting as a first transaction identifier to the identity server for the transaction session to which the transaction relates;
   obtaining contact information for the second party; and
   providing, by the application through a messaging application, a first message including the token unique to the transaction to the second party using the contact information, the first message indicating to the second party that the transaction has been initiated and further including a first link to launch an instance of the application on a second computing device of the second party; and in a receiver mode:
   receiving a second message from a third party to a second transaction that includes a second token unique to the second transaction and a second link to launch a second instance of the application, the second token acting as a second transaction identifier to the identity server for a second transaction session that is unique to the second transaction and is stored at the identity server as a placeholder for information relating to the second transaction;
   sending the second token unique to the second transaction to the identity server;
   receiving at least an indication of the second amount of funds to be transferred from the third party to the first party from the identity server;
   authenticating the first party to the identity server;
   determining that the first party wishes to complete the second transaction;
   responsive to determining that the first party wishes to complete the second transaction, providing account information for the first party to the identity server for storing in association with the second transaction session for the second transaction and to enable the identity server to facilitate the second transactions; and
   receiving a result of the second transaction from the identity server.

2. The method according to claim 1, wherein the messaging application comprises any one of an SMS application;
   an instant messenger application; or
   an e-mail application.

3. The method according to claim 1, wherein the authenticating is performed based on a Fast IDentity Online (FIDO) protocol.

4. The method according to claim 1, wherein, in the sender mode, the first party is one of a payer or a payee and the second party is the other of the payer and the payee, wherein, in the receiver mode, the first party is one of a payer or a payee and the third party is the other of the payer and the payee.

5. The method according to claim 1, wherein in the sender mode, the application is arranged to specify authentication criteria for the second party to the transaction.

6. The method according to claim 1, wherein the application is integrated within an application providing functionality other than funds transfer.

7. The method according to claim 1, wherein the application is cooperable with an electronic wallet to retrieve the account information for the party and/or second party.

8. The method according to claim 1, wherein the first message to the second party comprises instructions for the second party to enable the second party to install the application on their device.

9. The method according to claim 1, wherein the obtaining contact information comprises the application obtaining contact information from a contact list for the party and displaying the contact list for selection of a second party contact.

10. A computer program product comprising a computer readable medium on which instructions for an application are stored which, when executed on a computing device, direct the computing device to at least:
  in a sender mode:
    authenticate a first party to an identity server;
    obtain from the first party an amount of funds to be transferred between the first party and a second party;
    cause the identity server to establish a transaction session unique to the transaction, the transaction session providing a placeholder for information relating to the transaction;
    provide account information having the amount of funds to be transferred from the first party and an indication of the amount of funds to be transferred to the identity server for storing in association with the transaction session;
    obtain a token unique to the transaction from the identity server, the token acting as a first transaction identifier to the identity server for the transaction session to which the transaction relates;
    obtain contact information for the second party; and
    provide, by the application through a messaging application, a first message including the token unique to the transaction to the second party using the contact information, the first message indicating to the second party that the transaction has been initiated and further including a first link to launch an instance of the application on a second computing device of the second party; and
  in a receiver mode:
    receive a second message from a third party to a second transaction that includes a second token unique to the second transaction and
    a second link to launch a second instance of the application, the second token acting as a second transaction identifier to the identity server for a second transaction session that is unique to the second transaction and is stored at the identity server as a placeholder for information relating to the second transaction;
    send the second token unique to the second transaction to the identity server;
    receive at least an indication of the second amount of funds to be transferred from the third party to the first party from the identity server;
    authenticate the first party to the identity server;
    determine that the first party wishes to complete the second transaction;
    responsive to determining that the first party wishes to complete the second transaction, providing account information for the first party to the identity server for storing in association with the second transaction session for the second transaction and to enable the identity server to facilitate the second transaction; and
    receive a result of the second transaction results for any completed transaction from the identity server.

11. The computer program product according to claim 10, wherein the instructions are executable either as a stand-alone client application; or as a browser based application.

12. A computing device for performing a peer-to-peer transfer and including an application arranged to perform a method comprising the application:
  in a sender mode:
    authenticating a first party to an identity server;
    obtaining from the first party an amount of funds to be transferred between the first party and a second party;
    causing the identity server to establish a transaction session unique to the transaction, the transaction session providing a placeholder for information relating to the transaction;
    providing account information having the amount of funds to be transferred from the first party and an indication of the amount of funds to be transferred to the identity server for storing in association with the transaction session;
    obtaining a token unique to the transaction from the identity server, the token acting as a first transaction identifier to the identity server for the transaction session to which the transaction relates;
    obtaining contact information for the second party; and
    providing, by the application through a messaging application, a first message including the token unique to the transaction to the second party using the contact information, the first message indicating to the second party that the transaction has been initiated and further including a first link to launch an instance of the application on a second computing device of the second party; and
  in a receiver mode:
    receiving a second message from a third party to a second transaction that includes a second token unique to the second transaction and a second link to launch a second instance of the application, the second token acting as a second transaction identifier to the identity server for a second transaction session that is unique to the second transaction and is stored at the identity server as a placeholder for information relating to the second transaction;
    sending the second token unique to the second transaction to the identity server;
    receiving at least an indication of the second amount of funds to be transferred from the third party to the first party from the identity server;
    authenticating the first party to the identity server;
    determining that the first party wishes to complete the second transaction;
    responsive to determining that the first party wishes to complete the second transaction, providing account information for the first party to the identity server for storing in association with the second transaction session for the second transaction and to enable the identity server to facilitate the second transaction; and
    receiving a result of the second transaction from the identity server.

* * * * *